Figure 4:
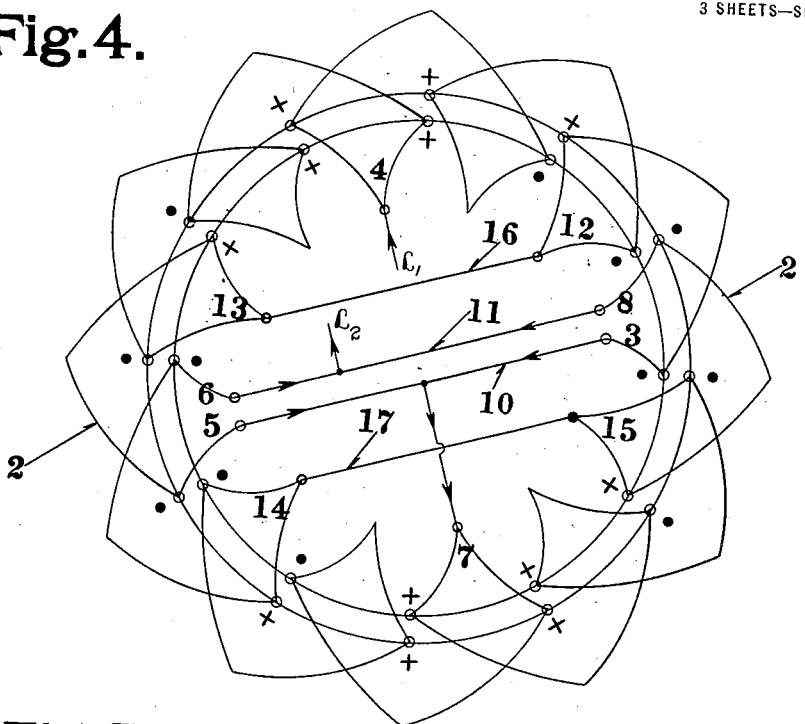

H. WEICHSEL.
WINDING FOR MULTIPLE SPEED MOTORS.
APPLICATION FILED JULY 16, 1919.
1,366,984.
Patented Feb. 1, 1921.
3 SHEETS—SHEET 1.
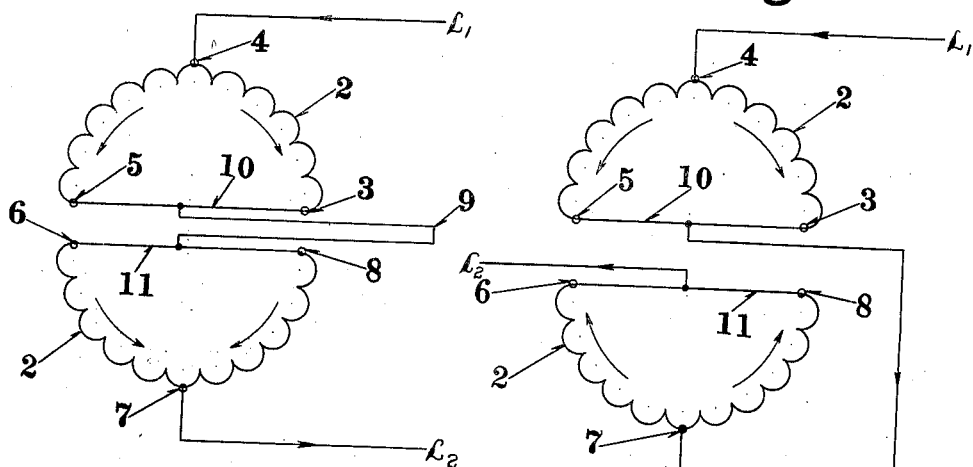
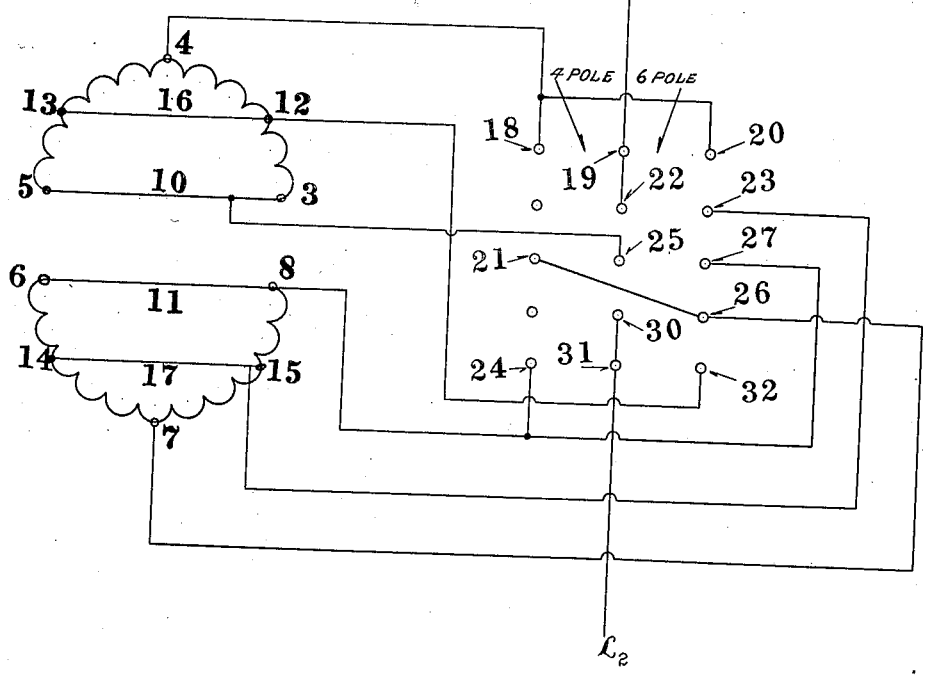
INVENTOR
Hans Weichsel
BY E. E. Huffman
ATTY

H. WEICHSEL.
WINDING FOR MULTIPLE SPEED MOTORS.
APPLICATION FILED JULY 16, 1919.

1,366,984.

Patented Feb. 1, 1921.

3 SHEETS—SHEET 2.

INVENTOR_
Hans Weichsel
BY J. E. Huffman
ATT'Y_

H. WEICHSEL.
WINDING FOR MULTIPLE SPEED MOTORS.
APPLICATION FILED JULY 16, 1919.

1,366,984.

Patented Feb. 1, 1921.
3 SHEETS—SHEET 3.

INVENTOR.
Hans Weichsel
BY
ATTY.

UNITED STATES PATENT OFFICE.

HANS WEICHSEL, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

WINDING FOR MULTIPLE-SPEED MOTORS.

1,366,984.   Specification of Letters Patent.   Patented Feb. 1, 1921.

Application filed July 16, 1919. Serial No. 311,153.

*To all whom it may concern:*

Be it known that I, HANS WEICHSEL, a citizen of Germany, residing at the city of St. Louis, State of Missouri, United States of America, have invented certain new and useful Windings for Multiple-Speed Motors, of which the following is such a full, clear, and exact description as will enable any one skilled in the art to which it appertains to make and use the same, reference being had to the accompanying drawings, forming part of this specification.

My invention relates to windings for multiple speed motors and particularly to inducing windings of multiple speed single phase motors although it is also applicable to polyphase machines.

So-called diamond windings are particularly advantageous for multiple speed work and the simplest arrangement is the one in which all poles are connected in parallel for every number of poles used, thus if the winding is designed for four and six poles, it will be connected in four parallel groups in the first and in six parallel groups in the second case. But in order to make such regrouping possible, the winding must have a multiplicity of terminal leads. The object of this invention is to reduce the number of these terminal leads and eliminate the contingent complication and expense while another is to secure an advantageous field shape with all pole members for which the winding is designed. I achieve the first by providing permanent cross connections between points of the winding which are at equal potential for all numbers of poles used, and I secure the second by suitably selecting the coil pitch or throw of the winding. Other objects and advantages of my invention will appear from the more detailed description.

Referring to the accompanying drawing, Figures 1 and 2 diagrammatically show the invention as applied to a winding which can be connected for two and for four poles; Fig. 3 as applied to a winding which can be connected for four and six poles; Figs. 4, 5 and 6, 8 show the actual location of winding elements along the motor periphery; and Figs. 7 and 9 indicate the shape of field for the four and six pole positions of the switch shown in Fig. 3.

Referring to Figs. 1 and 2, the stator or rotor winding 2 is divided into two parts, the ends 3, 5 of one part are joined by means of the permanent equipotential cross connection 10 and the middle point of this part is tapped at 4. Similarly the ends 6, 8 of the other half are interconnected by the permanent equipotential connection 11 and its center is tapped at 7. In order to produce two poles, the line $L_1$ is connected to 4, the line $L_2$ to 7 and 10 and 11 are interconnected as shown in Fig. 1. For four poles, $L_1$ is left connected to 4, but 10 is connected to 7 and 11 to $L_2$ as seen in Fig. 2.

In Fig. 3 the winding 2 is arranged for four and six pole connection and can, in addition, be connected for two poles as in Fig. 1. In addition to the two permanent cross connections 10, 11 and the taps 4, 7 of Figs. 1 and 2, permanent cross connections 16, 17 are added, point 13 being placed to divide the part 4, 5 in the proportion of two to one and points 12, 14 and 15 being similarly placed. A two throw five blade switch, the blades of which are pivoted at 19, 22, 25, 30, and 31 reorganizes the connections. When thrown to the left in contact with the terminals 18, 21, 24, the winding is connected for four poles. When thrown to the right in contact with 20, 23, 27, 26, and 32 the winding is connected for six poles.

Figure 5:
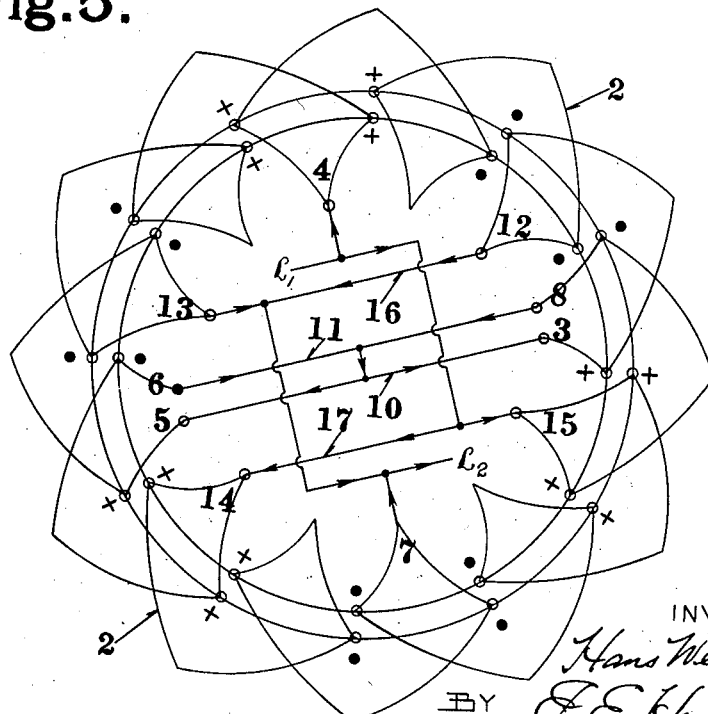

Figs. 4 and 5 show how a winding arranged as in Fig. 3 is actually distributed on the rotor or stator to which it is applied. It is usual to dispose such windings in slots and in Figs. 4 and 5 it has been assumed that there are twelve slots with two conductors per slot. The direction of the current in each conductor for some given instance is indicated by a dot or a cross placed next to the conductor, crosses indicating downwardly, and dots upwardly directed current. In this case, the coil pitch or throw has been chosen equal to the six pole pitch. I find that this pitch not only gives a useful field shape for the four as well as for the six pole connection, but allows of the motor to be connected to the same voltage for both pole combinations.

Figure 6:
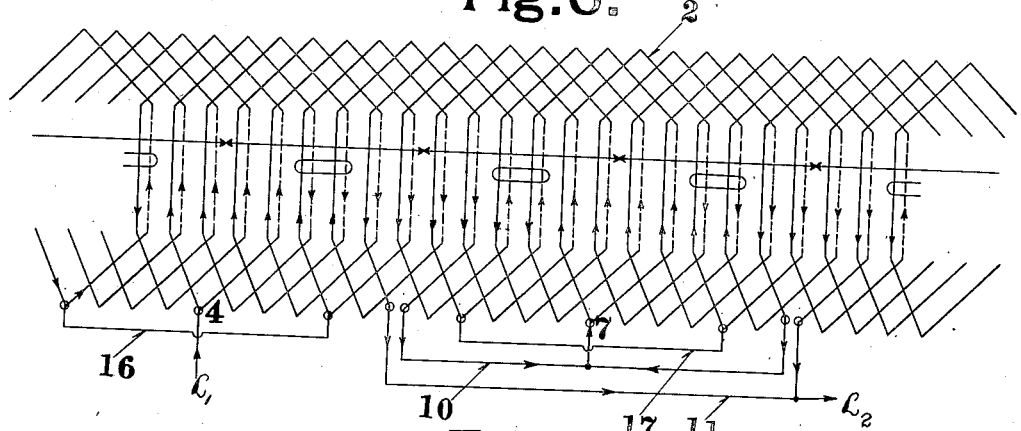
Figure 7:
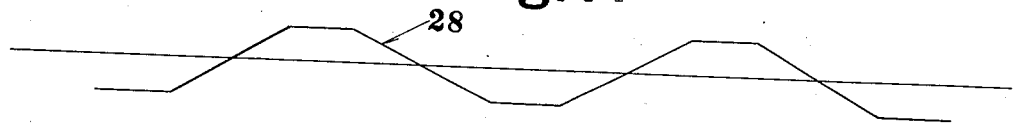
Figure 8:
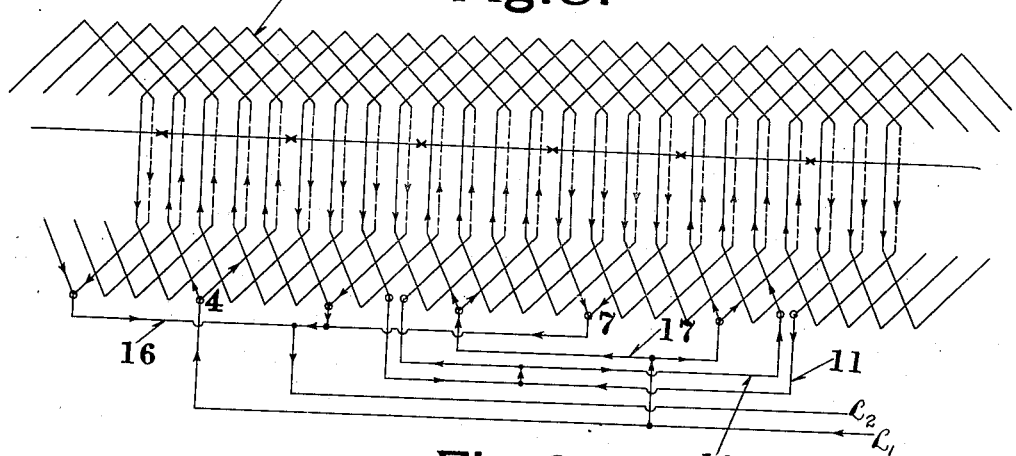
Figure 9:
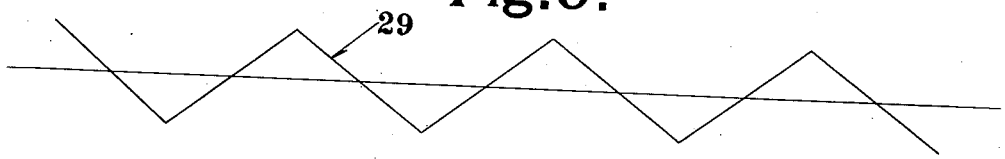

Figs. 6 and 8 show the same winding as in Figs. 4 and 5 by another form of diagram from which the field shape shown in Figs. 7 and 9 for four and six poles respectively can be more readily derived.

Having fully described my invention, what I claim as new and desire to secure by Letters Patent of the United States is:

1. An inducing winding for multiple speed alternating current motors provided with one or more permanent cross connections, said connections joining points at which the potential is equal for each number of poles which the winding is arranged to produce.

2. A diamond inducing winding for multiple speed alternating current motors provided with one or more permanent cross connections, said connections joining points at which the potential is equal for each number of poles which the winding is arranged to produce.

3. An inducing winding for multiple speed alternating current motors provided with a plurality of permanent cross connections joining points at which the potential is equal for the lowest number of poles which the winding is designed to produce whereby said winding will be adapted to produce higher numbers of poles.

4. A diamond inducing winding for multiple speed alternating current motors divided into two independent groups each group being provided with one or more permanent cross connections, said connections joining points at which the potential is equal for each number of poles which the winding is arranged to produce.

5. An inducing winding for multiple speed alternating current motors having a pole pitch smaller than the pole pitch of the smallest number of poles the winding is adapted to produce and provided with one or more permanent cross connections said connections joining points at which the potential is equal for each number of poles which the winding is arranged to produce.

In testimony whereof I have hereunto set my hand and affixed my seal.

HANS WEICHSEL. [L. S.]